(12) United States Patent
Bonte et al.

(10) Patent No.: US 9,750,193 B2
(45) Date of Patent: Sep. 5, 2017

(54) COMBINE HARVESTER WITH MULTI-STAGE GRAIN PREPARATION AND RELATED METHODS FOR OPERATING A COMBINE HARVESTER

(71) Applicant: CNH Industrial America LLC, New Holland, PA (US)

(72) Inventors: Ward Bonte, Heuvelland (BE); Todd A. Cannegieter, Boiling Springs, PA (US); Frank R. G. Duquesne, Zwevegem (BE); Bart M. A. Missotten, Herent (BE); Bart Moutton, Gits (BE); Dimitri Van Steenkiste, Bellem (BE); Benny Willem, Zuienkerke (BE); Bert Van De Steene, Poeke (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/900,077

(22) PCT Filed: Jun. 26, 2014

(86) PCT No.: PCT/EP2014/063535
§ 371 (c)(1),
(2) Date: Dec. 18, 2015

(87) PCT Pub. No.: WO2015/000787
PCT Pub. Date: Jan. 8, 2015

(65) Prior Publication Data
US 2016/0135372 A1      May 19, 2016

(30) Foreign Application Priority Data

Jul. 2, 2013    (BE) .................................. 2013/0461

(51) Int. Cl.
*A01F 12/48* (2006.01)
*B07B 1/50* (2006.01)
(Continued)

(52) U.S. Cl.
CPC .......... *A01F 12/48* (2013.01); *A01D 41/1271* (2013.01); *A01F 12/44* (2013.01);
(Continued)

(58) Field of Classification Search
CPC ........ A01F 12/444; A01F 12/44; A01F 12/00; A01F 12/18; A01F 12/446; A01F 12/42; A01D 41/12
(Continued)

(56) References Cited

U.S. PATENT DOCUMENTS 1,582,660 A * 4/1926 Baldwin ................. A01F 12/44
460/117
1,731,142 A * 10/1929 Lee .......................... A01F 12/00
460/73
(Continued)

FOREIGN PATENT DOCUMENTS

DE       8221573 U1    1/1986
FR       1281759 A     1/1962
(Continued)

*Primary Examiner* — Árpád Fábián-Kovács
(74) *Attorney, Agent, or Firm* — Patrick M. Sheldrake

(57) ABSTRACT

A combine harvester is provided with a threshing system, a preparation arrangement and cleaning arrangement. The preparation arrangement comprises multiple preparation stages, each of said stages being configured to transport said mixture over a given distance between a front edge and a rear edge of the stage, with an air gap being present between each pair of consecutive stages. The preparation arrangement further comprises a blower, separate from the main blower, said blower configured to direct air towards at least one of said air gaps, to thereby blow at least a portion of said (Continued)

mixture towards the rear of the combine harvester. The preparation arrangement comprises a plate provided with fins mounted transversally with respect to the longitudinal direction of the harvester, each fin representing one of said preparation stages, the plate further comprising one or more openings between at least one pair of consecutive fins.

14 Claims, 3 Drawing Sheets

(51) Int. Cl.
  *B08B 5/00*   (2006.01)
  *A01F 12/44*   (2006.01)
  *A01D 41/127*   (2006.01)
  *A01F 12/46*   (2006.01)

(52) U.S. Cl.
  CPC .......... *A01F 12/444* (2013.01); *A01F 12/446* (2013.01); *A01F 12/46* (2013.01)

(58) Field of Classification Search
  USPC .................. 460/100, 101, 109; 209/318, 312
  See application file for complete search history.

(56) References Cited

U.S. PATENT DOCUMENTS

| | | | |
|---|---|---|---|
| 1,864,772 A * | 6/1932 | Sprague | A01F 12/44 460/86 |
| 2,670,845 A * | 3/1954 | Busack | A01F 12/44 209/26 |
| 2,937,647 A | 5/1960 | Allen et al. | |
| 2,950,720 A * | 8/1960 | Sheard | A01D 75/282 209/416 |
| 3,392,832 A * | 7/1968 | Allen | A01F 12/444 209/318 |
| 4,250,897 A * | 2/1981 | Glaser | A01D 67/00 415/7 |
| 4,253,471 A | 3/1981 | Klimmer | |
| 4,353,376 A * | 10/1982 | Schuler | A01F 12/44 460/67 |
| 4,399,825 A * | 8/1983 | Raineri | A01F 12/18 460/109 |
| 4,444,208 A * | 4/1984 | Raineri | A01D 41/12 460/74 |
| 4,821,744 A * | 4/1989 | Turner | A01F 12/444 460/100 |
| 5,098,341 A * | 3/1992 | Kuchar | A01F 12/444 460/99 |
| 5,480,353 A | 1/1996 | Garza, Jr. | |
| 5,525,108 A * | 6/1996 | Rouse | A01F 12/448 460/101 |
| 6,773,343 B2 * | 8/2004 | Grywacheski | A01F 12/446 460/100 |
| 7,413,507 B2 * | 8/2008 | Weichholdt | A01F 12/446 460/100 |
| 7,416,482 B2 | 8/2008 | Weichholdt | |
| 7,566,266 B1 | 7/2009 | Ricketts et al. | |
| 8,626,400 B2 * | 1/2014 | Sheidler | A01D 69/02 460/1 |
| 8,651,927 B1 * | 2/2014 | Roberge | A01F 12/444 460/101 |
| 8,801,512 B2 | 8/2014 | Biggerstaff et al. | |
| 2014/0066145 A1 | 3/2014 | Bilde | |

FOREIGN PATENT DOCUMENTS

| | | |
|---|---|---|
| GB | 363570 A | 12/1931 |
| RU | 2343688 C1 | 1/2009 |
| WO | 8100503 A1 | 3/1981 |

\* cited by examiner

COMBINE HARVESTER WITH MULTI-STAGE GRAIN PREPARATION AND RELATED METHODS FOR OPERATING A COMBINE HARVESTER

This application is the US National Stage filing of International Application Serial No. PCT/EP2014/063535 filed on Jun. 26, 2014 which claims priority to Belgium Application BE2013/0461 filed Jul. 2, 2013, each of which is incorporated herein by reference in its entirety.

FIELD OF THE INVENTION

The present invention is related to combine harvesters for gathering and processing crop material from a field, in particular to systems for preparing the crop mixture received from the threshing rotors and transporting said mixture towards a cleaning arrangement.

STATE OF THE ART

Combine harvesters are equipped with a preparation means and a cleaning arrangement. The preparation means are located underneath the threshing drums of the harvester and receive a mixture of grains and crop residue from which the grains need to be further separated. The function of the preparation means is to move the mixture progressively towards the cleaning arrangement, the latter comprising a set of sieves, configured to sieve the mixture and to obtain the separated grains that fall through the sieves, while heavier residue is collected at the rear of the sieves and lighter residue is blown towards the rear by a blower producing an air stream in between the sieves.

The preparation means that is most widely applied is the reciprocating grain pan arranged to oscillate backwards and forwards in the longitudinal direction of the harvester so as to move the mixture towards the cleaning arrangement. This setup has the advantage that it uses the differing densities of grain vs. residue in combination with a reciprocating motion to stratify the mixture with denser grain moving to the bottom of the mixture and lighter residue material moving toward the top—thus partially pre-separating the residue from the grain before delivering it to the sieves. On the other hand, the reciprocating grain pan is a relatively passive means of transport, and is therefore subject to negative effects on conveyance due to gravity when harvesting on hilly terrain.

Another known separation means comes in the form of an auger bed, which is composed of a plurality of augers oriented generally in the longitudinal direction of the machine. These augers convey the mixture from the threshing chamber to the sieves with relatively little effect from machine inclination. The augers also deliver a nearly constant flow of material to the sieves, unlike the grain pan which demonstrates a more cyclic sloughing of material in time with its reciprocating motion. The disadvantage of an auger bed system is that the rotating augers tend to mix the grain and residue components as they convey the material creating a mixture that is more difficult to clean.

The use of multiple preparation stages with a separate blower means aiming an air stream at the gaps between subsequent stages is known, for example from WO-A-8100503 or DE8221573U1. Due to the relatively large size of the gaps, a portion of the mixture is in danger of being lost by falling through the gaps. Despite the air stream directed at the gap, part of the mixture may initially move in the backward direction when falling from one stage onto the next, especially when the preparation stages are formed or comprise at least one reciprocating grain pan. This may be the cause of significant losses.

SUMMARY OF THE INVENTION

The invention is related to a combine harvester equipped with an improved preparation means that overcomes at least some of the problems described above, as well as to a method for operating such a preparation means. Such a combine harvester and method are disclosed in the appended claims.

The present invention is thus generally related to a combine harvester provided with a threshing means, a preparation means and a cleaning arrangement. The preparation means comprises multiple preparation stages, each of said stages being configured to transport a mixture of grain and residue over a given distance between a front edge and a rear edge of the stage, with an air gap being present between two subsequent preparation stages. The air gap between a first and second stage is situated near the rear edge of the first stage where the mixture falls from said first stage onto the second stage. The preparation means further comprises a blower means that is separate from the main blower, said blower means being configured to direct air, for example in the form of an air stream or a sequence of air blasts, towards at least one of said air gaps. In this way, the air produced by the separate blower means is directed at the mixture as it falls from one stage to a subsequent stage, so that at least a portion of said mixture is blown towards the rear of the combine harvester.

According to the invention, the preparation means comprises a plate provided with fins mounted transversally with respect to the longitudinal direction of the harvester, each fin representing one of said preparation stages, the plate further comprising one or more openings between at least one pair of consecutive fins, said opening(s) being suitable for allowing the passage of an air stream produced by the separate blower means, and directed towards the gap between the pair of consecutive fins.

DETAILED DESCRIPTION OF PREFERRED EMBODIMENTS OF THE INVENTION

Preferred embodiments will now be described with reference to the drawings. The detailed description is not limiting the scope of the invention, which is defined only by the appended claims. The terms 'upstream' and 'downstream' are to be understood in relation to the travel direction of crop materials in the harvester, i.e. from the front of the harvester to the back.

In a combine harvester according to the invention, the preparation means comprises a cascade of separation stages, placed in succession in the longitudinal direction of the harvester (defined as the direction between the front and rear wheels or tracks of the harvester), so that a grain and residue mixture that is transported towards the rear edge of one of the stages except the last falls onto a subsequent stage, thereby crossing an air gap between the two consecutive stages. The preparation means further comprises at least one dedicated blower that is configured to produce an air stream or air blasts aimed at one or more of the gaps and directed towards the rear of the machine. A dedicated blower is to be understood as: a blower that is configured only for the task of producing said air stream or blasts. The dedicated blower is thus separate and works independently from the blower configured to blow air between the sieves.

Figure 1:
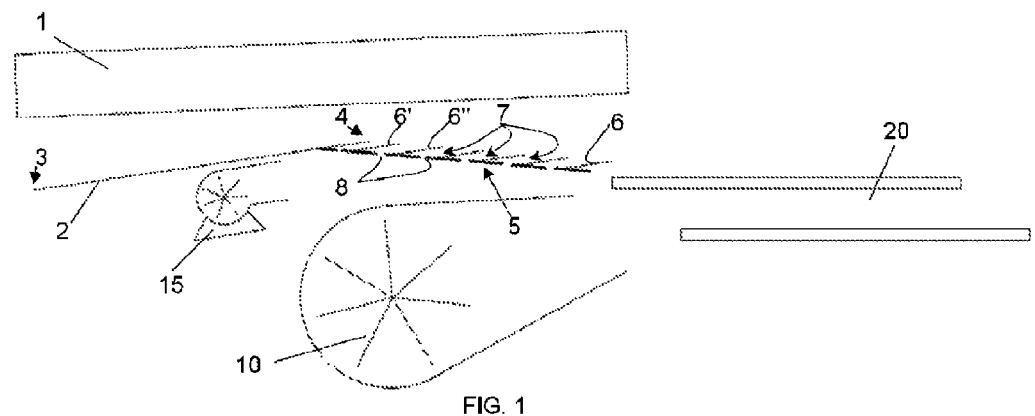
FIG. 1 shows a number of relevant components in a harvester according to a first embodiment of the invention, wherein the preparation means comprises a reciprocating grain pan and a perforated plate provided with fins, said plate being attached to said preparation pan.

FIG. 1 illustrates a first embodiment according to the invention. The threshing rotors 1 are shown, oriented in the longitudinal direction of the harvester, although the invention is not limited to machines of this type (transversal threshing rotors are also possible). The cleaning arrangement comprises a main blower 10 and a set of sieves 20. The main blower 10 is mounted in a manner known as such in the art, for blowing an air stream in between the sieves 20, to thereby blow light residue material towards the rear of the harvester. Underneath the rotors 1 and upstream of the main blower 10 and the sieves 20, a first preparation pan 2 is mounted, inclined slightly upward with respect to the horizontal direction. The pan 2 has a front edge 3 and a rear edge 4 and is connected to a suitable mechanism for actuating a reciprocating movement of the pan, configured to move a mixture of grains and residue towards the rear edge of the pan, in a manner known as such in the art.

Fixed to the pan 2, and oriented downwards, is a plate 5, provided with upwardly tilted or horizontal fins 6, placed transversally with respect to the harvester's longitudinal direction. Material that advances beyond the rear edge 4 of the first pan 2 falls onto the first fin 6', thereby crossing a gap 7. As the plate 5 is fixed to the pan 2, it undergoes the same reciprocating movement, so that the grain mixture is progressively transported from the first fin 6' to the second fin 6" and so on until the rear edge of the plate 5, each time crossing a gap 7 when moving from one fin to the next. Between each pair of fins, the plate 5 is provided with a slit or a row of holes, or generally any suitable kind of openings 8, allowing the passage of an air stream or air blasts originating from a fan 15 and directed towards the gaps 7. The fan 15 is separate and configured to work independently from the main blower 10. The fan 15 thus represents the independent blower means referred to above. The fan 15 is mounted upstream of the gaps 7 that are present between each pair of consecutive fins 6, and configured to produce an air stream or blasts of air in the direction of the gaps, thereby blowing lighter residue material from the mixture towards the rear of the harvester, while the heavier grains are maintained on the fins 6.

The fan 15 may for example be fixed to the first preparation pan 2, or to the chassis of the harvester. The fan 15 may be mounted in close proximity to the first of the gaps 7, as illustrated in FIG. 1, or it may be placed more upstream, possibly with suitable air guide panels mounted to guide the air from the fan towards the gaps 7. The air stream or blasts produced by the fan 15 are configured to blow lighter residue towards the rear of the harvester and thereby establish a separation of the mixture prior to the point where the mixture is delivered to the sieves 20. At the rear edge of the plate 5, the mixture is delivered to the sieves 20 of the cleaning arrangement and treated further in the manner known in the art.

The plate 5 makes it possible to provide multiple preparation stages over a short distance, each fin 6 representing a preparation stage, with the grain mixture moving from the front edge of a fin to the rear edge before falling onto the next fin. Every time the mixture falls from one fin onto the next, the air produced by the blower 15 is capable of blowing light residue material towards the back of the harvester. This facilitates a more thorough pre-cleaning of the mixture. The plate 5 is downwardly oriented as seen in the direction from the front of the harvester to the back, so that the front edge of a fin is located underneath the rear edge of the previous fin. The fins 6 as such are horizontally or slightly upwardly oriented, as shown in the drawings, so as to support the mixture. The fins are preferably overlapping to a degree, i.e. the rear edge of a fin extends beyond the front edge of a subsequent fin.

According to a preferred embodiment, the size of the openings or slits 8 is configured to allow the passage of air from the fan 15, whilst obstructing the passage of grains and residue from the mixture that is being carried by the fins 6. In this way, it is impossible for grain or residue to 'fall through' the gaps 7 in the direction opposite the general direction of movement of the mixture. Even when the holes or slits 8 would allow small particles of the mixture to pass through the holes, any significant flow of material through the gaps 7 is obstructed by the presence of the plate 5. The invention thereby ensures transport of the mixture with less mixture losses compared to existing systems. Openings 8 are preferably present between each pair of consecutive fins 6. However, the embodiment wherein openings 8 are provided between only some pairs of fins is also included in the invention's scope.

According to an embodiment, the plate 5 is mounted separately from the first preparation pan 2 instead of being fixed to said preparation pan 2. In that case, the plate 5 is driven to undergo a reciprocating movement that is independent of the movement of the first pan 2. The reciprocating movement of the plate 5 can then be better adjusted to the size of the fins 6 and/or to the type and size of the harvested grains.

Figure 2:
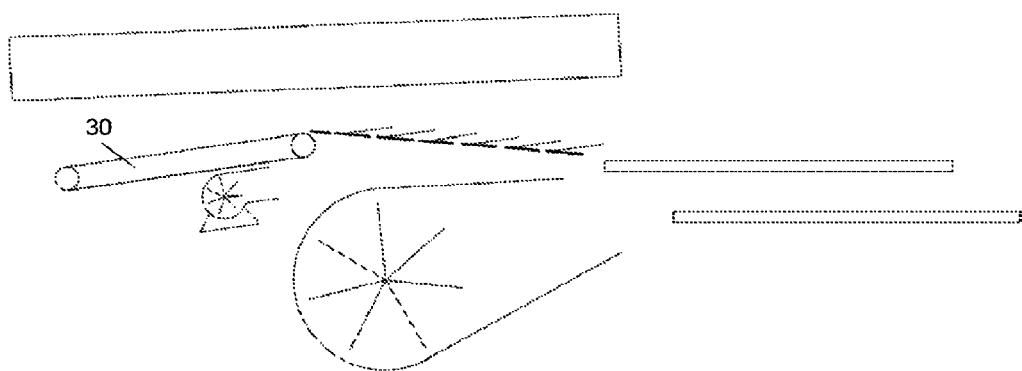
FIG. 2 shows an embodiment wherein the preparation means comprises an auger bed and a perforated plate.
Figure 3:
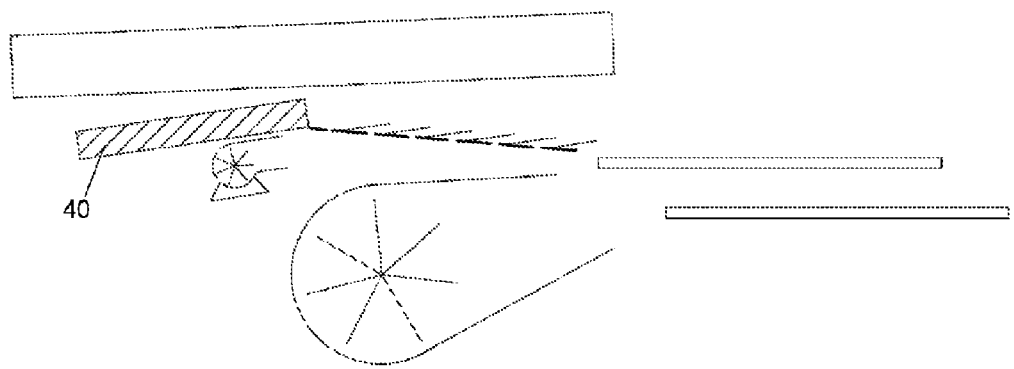
FIG. 3 shows an embodiment wherein the preparation means comprises a belt conveyer and a perforated plate.

The plate 5 can be used in combination with other types of grain preparation stages known in the art, such as a conveyor belt 30 or an auger bed 40, as illustrated in FIGS. 2 and 3. Instead of a conveyor belt, other types of a conveyor means comprising a carrier surface configured to exhibit a movement from the front edge of the preparation stage to the rear edge of the preparation stage may be used.

Figure 4:
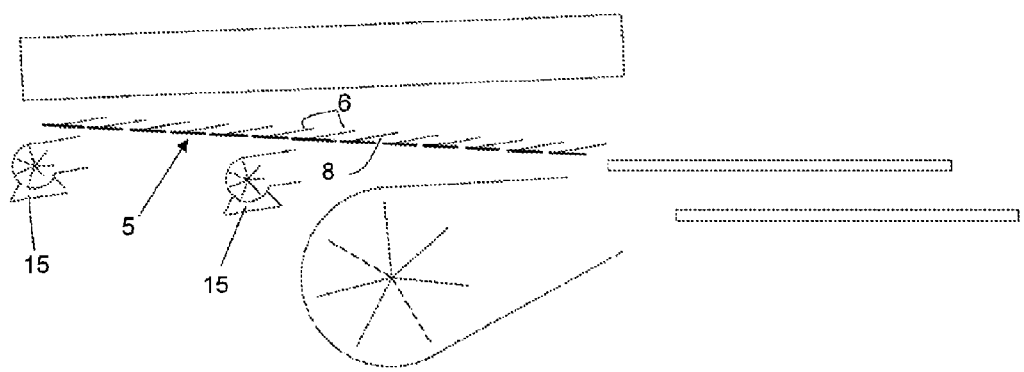
FIG. 4 shows an embodiment wherein the preparation means consists of a perforated plate in accordance with the invention, and provided with multiple blowers.

According to an embodiment illustrated in FIG. 4, the entire preparation area is formed of one single plate 5 provided with fins 6. As shown in FIG. 4, more than one separate fan 15 may then be mounted for blowing air or air blasts through the gaps 7, each fan being positioned to supply air to one or more of the gaps 7 along the length of the plate 5. According to an embodiment, a single fan is present, configured to blow air at several gaps 7 through the application of suitable air guide means, or a plurality of separate fans may be present, configured to blow air at a corresponding plurality of gaps, or a combination of the former two options (single fan blowing at several gaps and separate fans blowing at corresponding gaps) may be arranged.

Figure 5:
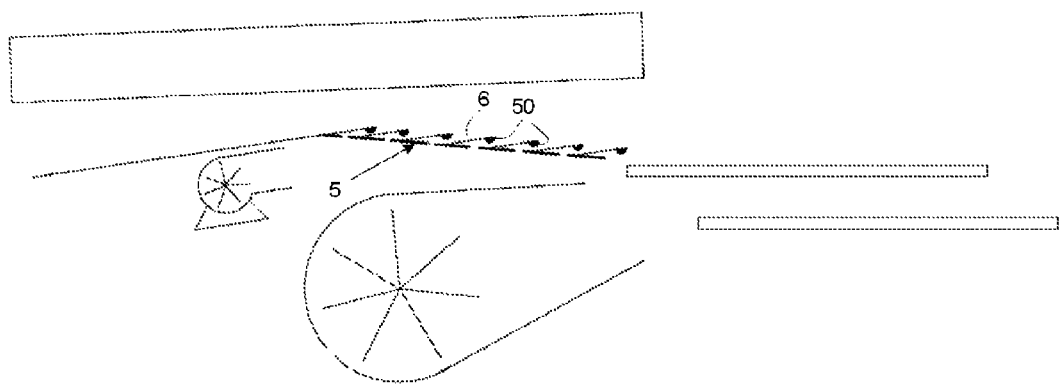
FIG. 5 shows an embodiment wherein the fins are provided with deflection means for deflecting the air stream directed at the gaps between consecutive fins.

In the embodiment illustrated in FIG. 5, at least one of the multiple preparation stages is provided at its rear edge with a deflection means 50 for deflecting the direction of the air flow directed at the air gap 7 between said stage and the subsequent stage. In the embodiment shown, the deflection means takes the shape of a semi-cylinder 50 mounted in the gap between two consecutive fins 6, and establishing a progressive narrowing and subsequent widening of the gap 7 as the air from the blower 15 passes through it. This narrowing of the gap causes an increase in the air speed which is effective in blowing light residue material over a larger distance downstream of the gap 7. Other shapes of deflection means having a narrowing and air-speed-increasing effect on the gap may be implemented.

The separate blower means 15 may be mounted on the chassis of the harvester or on one of the preparation stages. In the latter case, the blower means may be mounted on a preparation stage other than a fin 6, for example on the preparation pan 2 in the embodiment of FIG. 1 or on the conveyor belt in the embodiment of FIG. 2. It is also possible however to mount a blower means, e.g. a plurality of small fans on or in any case attached to one or more of the fins 6. The option of mounting the blower means on a preparation stage is particularly useful in the case of an auto-leveled preparation stage, for example a preparation pan that is provided with means (known as such in the art) for maintaining the pan essentially horizontal regardless of the inclination of the field. When the blower means is mounted on such a preparation pan, the direction and force of the air stream relative to the preparation pan is equally maintained regardless of the field inclination, ensuring a stable operation even on hilly terrain.

The separate blower means allows establishing an enhanced pre-separation between grain and residue material upstream of the cleaning arrangement. The separate blower means may be controlled independently from the main blower, for example on the basis of a measurement of characteristics of the air stream directed at the air gaps 7. According to an embodiment (not shown), a sensor is mounted so as to measure relevant characteristics of the air stream produced by the separate blower means 15. For example, a sensor may be mounted in the vicinity of one or more of the air gaps 7. Control means are then included in the harvester, allowing to measure the air speed, pressure, humidity or other characteristics of the air stream, and to control the separate blower means on the basis of the measurement, for example increasing the speed of the fan 15 when an increased humidity of the air stream is detected, ensuring efficient blowing off of light residue materials even if the latter are heavier due to wet harvesting conditions. According to a preferred control method of the separate blower means, said blower means is operated initially at a speed determined on the basis of the speed of the main blower 10, so as to obtain optimal adjustment of the pre-separation effect from the separate blower means to the main separation effect from the main blower. During operation, adjustments to the separate blower means are then effectuated on the basis of the sensor measurements. In this way, an increased flexibility of the harvester's separation process is reached. Alternatively or in addition to a sensor for measuring air stream characteristics, one or more sensors may be mounted on at least one of the preparation stages, the latter sensors being configured to measure characteristics of the advancing grain/residue mixture, for example grain loss sensors. Again, the control of the blower means 15 may be based on the measurement values obtained through said sensors.

The invention claimed is:

1. A combine harvester comprising:
   a cleaning arrangement comprising one or more sieves and a main blower; and
   a preparation arrangement configured to receive a mixture of grain and residue material from a threshing system and to transport the mixture towards the cleaning arrangement, wherein the preparation arrangement comprises multiple preparation stages, each of said stages being configured to transport the mixture over a given distance between a front edge and a rear edge of the respective stage, with an air gap being present between each pair of consecutive stages, and wherein the preparation system further comprises a separate blower that is separate from the main blower, the separate blower configured to direct air towards at least one of the air gaps, to thereby blow at least a portion of the residue material from the mixture towards the rear of the combine harvester, wherein the preparation arrangement comprises a plate provided with fins mounted transversally with respect to the longitudinal direction of the harvester, each fin representing one of said preparation stages, said plate further comprising one or more openings between at least one pair of consecutive fins, said one or more openings being suitable for allowing the passage of an air stream produced by the separate blower, and directed towards the gap between the pair of consecutive fins,
   wherein the openings are sized to prevent a substantial portion of the grain and residue material from passing through the openings in the direction opposite the air stream produced by the separate blower.

2. Combine harvester according to claim 1, wherein at least one of the preparation stages comprises a preparation pan, configured to exhibit a reciprocating movement for transporting said mixture.

3. Combine harvester according to claim 1, wherein the plate is inclined at a downward slope from the front to the back of the harvester, and wherein the fins are horizontal or upwardly inclined.

4. Combine harvester according to claim 1, wherein the plate is configured to be subjected to a reciprocating movement, to thereby move the mixture from the front edge to the rear edge of each fin.

5. Combine harvester according to claim 4, wherein one of the preparation stages consists of a preparation pan configured to undergo a reciprocating motion, and wherein the plate is attached to said preparation pan.

6. Combine harvester according to claim 1, wherein at least one of said preparation stages comprises a conveyor comprising a carrier surface configured to exhibit a movement from the front edge of the stage to the rear edge of the stage.

7. Combine harvester according to claim 1, wherein at least one of said preparation stages comprises an auger bed.

8. Combine harvester according to claim 1, wherein said separate blower is a fan.

9. Combine harvester according to claim 1, wherein said separate blower is mounted on the preparation stage immediately preceding the air gap which said separate blower is configured to direct an air stream to.

10. Combine harvester according to claim 1, wherein said separate blower is mounted on the chassis of the combine harvester.

11. Combine harvester according to claim 1, wherein at least one of the preparation stages is provided at its rear edge with a deflector for deflecting the direction of the air flow directed at the air gap between said stage and the subsequent stage.

12. Combine harvester according to claim 11, wherein said deflector is configured to establish a progressive narrowing and subsequent widening of the gap.

13. Combine harvester according to claim 11, wherein said deflector is provided at the rear edge of at least one of the fins.

14. Combine harvester according to claim 1, wherein the preparation arrangement consists of the single plate provided with fins.

* * * * *